United States Patent
Okuda (10) Patent No.: US 12,481,120 B2
(45) Date of Patent: Nov. 25, 2025

(54) OPTICAL APPARATUS AND IMAGE PICKUP APPARATUS HAVING THE SAME

(71) Applicant: CANON KABUSHIKI KAISHA, Tokyo (JP)

(72) Inventor: Toshihiro Okuda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 18/351,078

(22) Filed: Jul. 12, 2023

(65) Prior Publication Data

US 2024/0027728 A1    Jan. 25, 2024

(30) Foreign Application Priority Data

Jul. 22, 2022   (JP) .................................. 2022-116855

(51) Int. Cl.
   *G02B 7/10*   (2021.01)
   *G02B 7/02*   (2021.01)

(52) U.S. Cl.
   CPC .............. *G02B 7/102* (2013.01); *G02B 7/021* (2013.01)

(58) Field of Classification Search
   CPC .......... G02B 7/021; G02B 7/10; G02B 7/102; G02B 7/04; G02B 7/09; G02B 7/023; G02B 7/08
   See application file for complete search history.

(56) References Cited

U.S. PATENT DOCUMENTS

| | | | |
|---|---|---|---|
| 11,656,424 B2 | 5/2023 | Okuda | |
| 2012/0050866 A1* | 3/2012 | Umezu | G02B 27/646 |
| | | | 359/557 |
| 2014/0168793 A1* | 6/2014 | Fukino | G02B 7/023 |
| | | | 359/823 |
| 2014/0233117 A1* | 8/2014 | Togawa | G03B 17/04 |
| | | | 359/823 |
| 2019/0064473 A1* | 2/2019 | Suzuki | G03B 17/561 |
| 2019/0103799 A1* | 4/2019 | Kawanabe | G03B 3/10 |
| 2021/0116671 A1* | 4/2021 | Okuda | G02B 7/022 |
| 2023/0393364 A1* | 12/2023 | Nagaoka | G02B 7/04 |

FOREIGN PATENT DOCUMENTS

| | | |
|---|---|---|
| JP | 2005241842 A | 9/2005 |
| JP | 2010113166 A | 5/2010 |
| JP | 2021067719 A | 4/2021 |

\* cited by examiner

*Primary Examiner* — Ephrem Z Mebrahtu
(74) *Attorney, Agent, or Firm* — ROSSI, KIMMS & McDOWELL LLP (57) ABSTRACT

An interchangeable lens comprises a first to a third guide units, and a rear unit base. Each of the first to third guide units includes a pair of guide members including one member and the other member, there are three regions divided in a circumferential direction around the optical axis, a region in which one member of the first guide unit is disposed is defined to as a first region, a region in which one member of the second guide unit is disposed is defined to as a second region, and a region in which one member of the third guide unit is disposed is defined to as a third region. The other member of second guide unit is disposed in first region, the other member of third guide unit is disposed in second region, and the other member of first guide unit is disposed in third region.

12 Claims, 6 Drawing Sheets

OPTICAL APPARATUS AND IMAGE PICKUP APPARATUS HAVING THE SAME

BACKGROUND OF THE INVENTION

Field of the Invention

The present disclosure relates to an optical apparatus and an image pickup apparatus having the same.

Description of the Related Art

A technique is known in which a plurality of lens units is moved at the time of focus adjustment in order to shorten the shortest photographing distance or to improve the close-range image quality.

Japanese Patent Application Laid-Open No. 2021-067719 discloses an optical apparatus having a configuration in which two lens units are moved by using different driving means.

The optical apparatus disclosed in Japanese Patent Application Laid-Open No. 2021-067719 achieves miniaturization in a configuration having two lens units. On the other hand, there is no disclosure of an optical apparatus having three or more moving units, and in a configuration having three or more moving units, it is necessary to consider impact resistance and miniaturization of each moving unit.

SUMMARY OF THE INVENTION

An aspect of embodiments provides, an optical apparatus advantageous in miniaturization.

According to an embodiment of the present disclosure, a lens apparatus comprising: a first holding member that holds a first lens; a second holding member that holds a second lens; and a third holding member that holds a third lens; a first guide unit configured to guide a movement of the first holding member; a second guide unit configured to guide a movement of the second holding member; and a third guide unit configured to guide a movement of the third holding member; a plurality of drive units; and a base member configured to hold the plurality of drive units, wherein each of the first guide unit, the second guide unit, and the third guide unit includes a pair of guide members including one member and the other member; when the base member is viewed along an optical axis of the lens apparatus, there are three regions divided in a circumferential direction around the optical axis, a region in which one member of the first guide unit is disposed is defined as a first region, a region in which one member of the second guide unit is disposed is defined as a second region, and a region in which one member of the third guide unit is disposed is defined as s third region; the other member of the second guide unit is disposed in the first region; the other member of the third guide unit is disposed in the second region; and the other member of the first guide unit is disposed in the third region.

Further features of the present disclosure will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
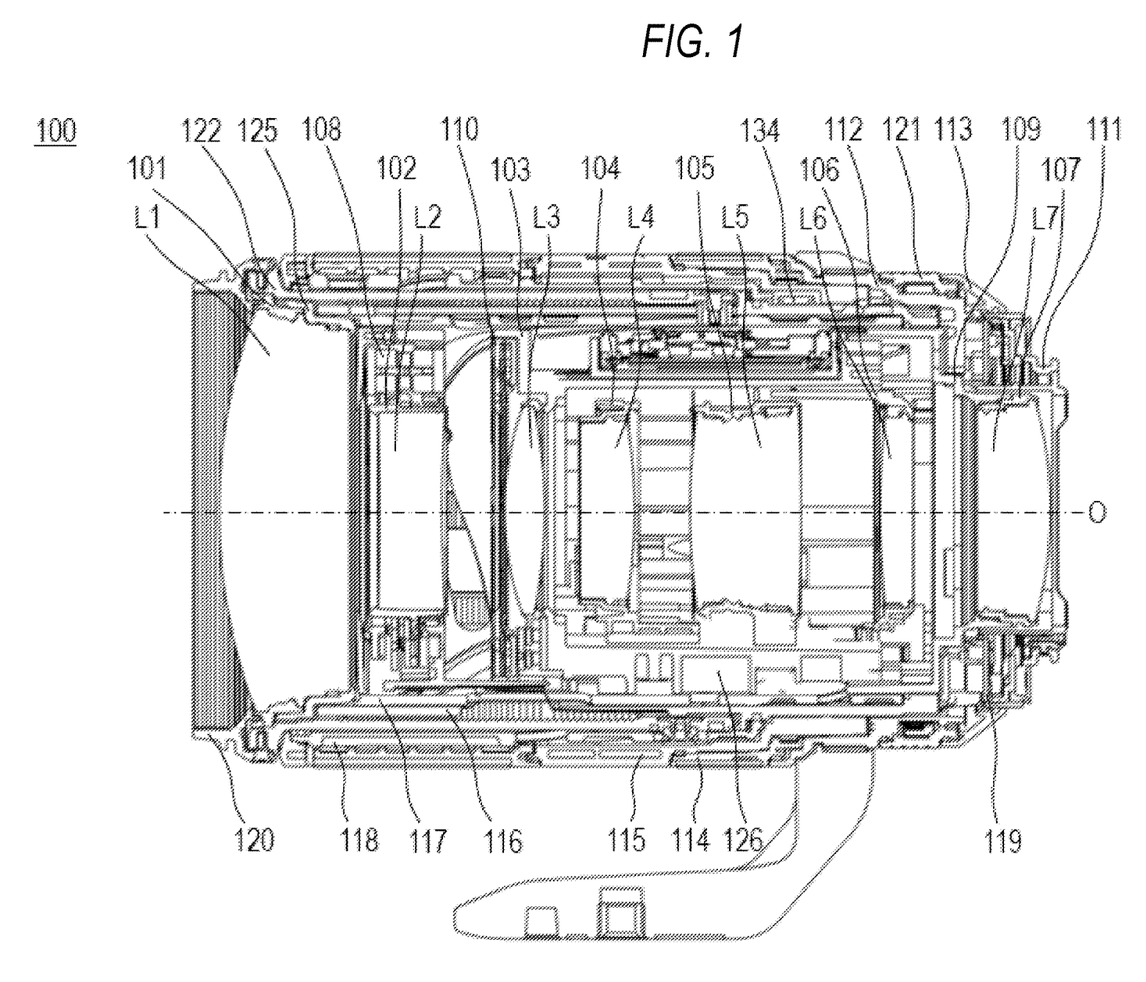
FIG. 1 is a cross-sectional view of a wide-angle end (wide end) of an interchangeable lens according to the first embodiment.
Figure 2:
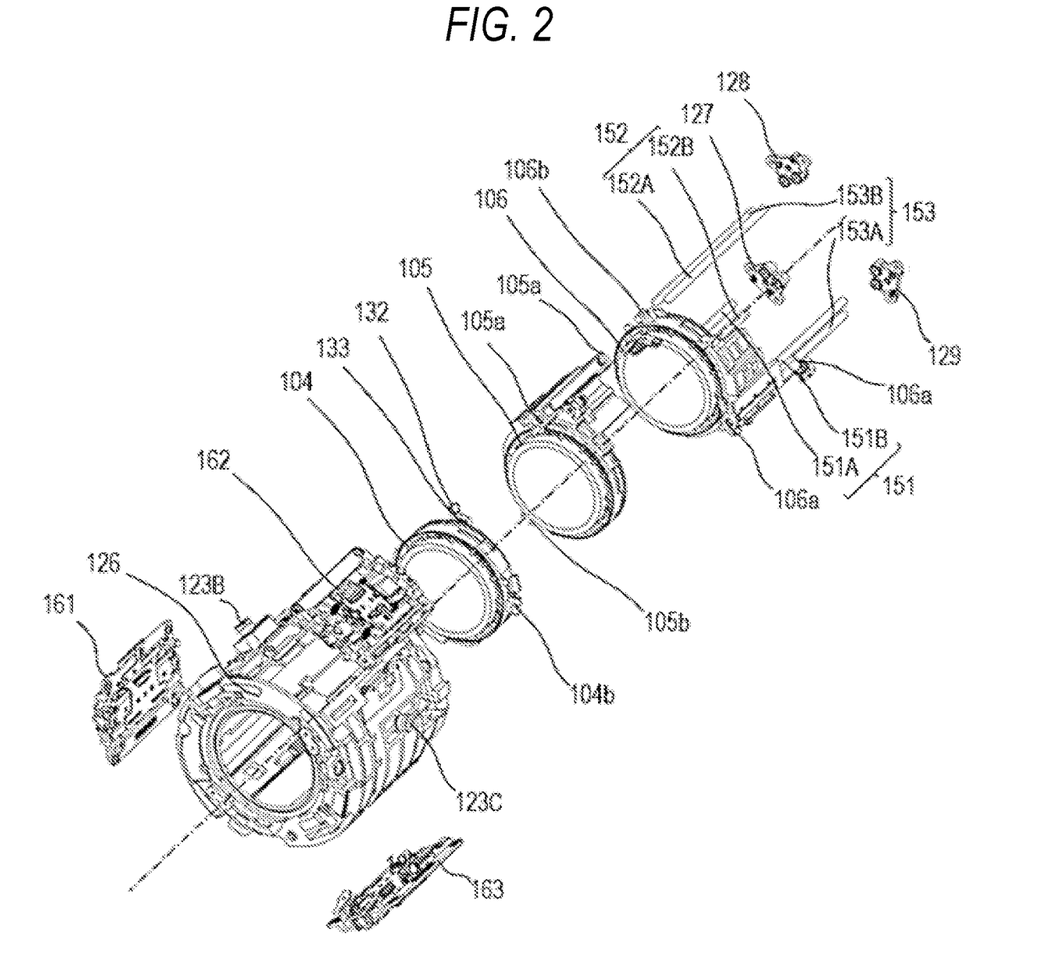
FIG. 2 is an exploded perspective view of a main part in the first embodiment.

Hereinafter, a configuration of an interchangeable lens 100 (optical apparatus) according to a first embodiment of the present disclosure will be described with reference to FIGS. 1 and 2. FIG. 1 is a cross-sectional view taken along a plane parallel to an optical axis O at a wide-angle end (wide end) of an interchangeable lens 100 according to the present exemplary embodiment. FIG. 2 is an exploded perspective view of a main part in the first embodiment.

The interchangeable lens 100 according to the present exemplary embodiment is an optical apparatus having a seven unit configuration including a first lens unit L1 to a seventh lens unit L7 (hereinafter, referred to as "each lens unit"). By a focusing operation in the interchangeable lens 100, a fourth lens unit L4 which is the first floating lens unit, a fifth lens unit L5 which is the second floating lens unit, and a sixth lens unit L6 which is the focus lens unit are moved in the optical axis direction. These moving lens units are hereinafter referred to as moving lens units.

In addition, all of the moving lens units move in the optical axis direction along each predetermined trajectory in advance by a zooming operation (zooming or magnification varying operation) in the interchangeable lens 100. At this time, a control unit 119 drives and controls the fourth lens unit L4, the fifth lens unit L5, and the sixth lens unit L6 so that the focus position changed by the zoom operation and the amount of each aberration are maintained to be equal to or less than a predetermined value.

Figure 6:
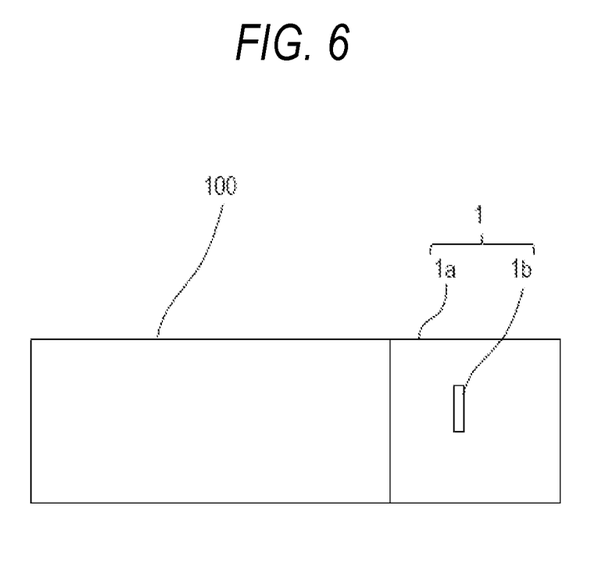
FIG. 6 is a schematic diagram illustrating a configuration example of an image pickup apparatus.

As shown in FIG. 6, a camera body 1a is an image pickup apparatus body provided with an image sensor 1b such as a CCD or a CMOS. The interchangeable lens 100 is held so as to be detachable from the camera body 1a, and the interchangeable lens 100 and the camera body 1a constitute a camera system.

A lens mount 111 has a bayonet portion for attaching the interchangeable lens 100 to the 1a of the camera body, and is fixed to a rear-side fixed barrel 112 via an exterior barrel 113 by a screw. The exterior barrel 113 is sandwiched and fixed between the lens mount 111 and the rear-side fixed barrel 112. A front fixed barrel 115 is fixed to the rear-side fixed barrel 112 with screws, and a zoom index and an operation switch (not shown) are attached to the front fixed barrel 115. A guide barrel 116 is fixed to the rear-side fixed barrel 112 with screws.

A straight groove for guiding each lens unit in a straight direction is formed in the guide barrel 116. A cam groove is also formed in the guide barrel 116, and a cam barrel 117 is held by a cam follower (not shown) fixed to the cam barrel 117 with a screw so as to be rotatable and extendable for zooming. The cam barrel 117 is formed with three kinds of cam grooves corresponding to the trajectory of the each lens units during the zooming operation.

Further, a zoom operation barrel 118 is radially fitted to the guide barrel 116, and is held by a bayonet so as to be rotatable about the optical axis. By the action of the cam groove provided in the zoom operation barrel 118, a cam follower provided on the outer side of a straight-proceeding barrel 122, and the straight groove of the guide barrel 116, the rotational force of the zoom operation barrel 118 is converted into the linear movement of the straight-proceeding barrel 122, and the straight-proceeding barrel 122 moves linearly by the zoom operation.

Here, the cam follower (not shown) provided on the straight-proceeding barrel 122 is also engaged with the cam groove of the cam barrel 117, and the straight motion of the straight-proceeding barrel 122 is converted into the rotational motion of the cam barrel 117. As described above, since the cam barrel 117 is held so as to be rotatable and extendable with respect to the guide barrel 116, as a result, the cam barrel 117 can be rotated and extended with respect to the optical axis O by the straight motion of the straight-proceeding barrel 122.

A rear unit (not illustrated) and a seventh lens unit (not illustrated) are configured to be driven with respect to the optical axis O by using a force with which the cam barrel 117 rotates and extends with respect to the guide barrel 116. More specifically, the rear unit and the seventh lens unit are driven by the action of rear unit cam followers 123A, 123B, and 123C (engagement portions, see FIG. 2), which will be described later, a seventh lens unit cam follower (not shown), each straight groove, and each cam groove. As described above, the mechanical movement of each lens unit according to the present exemplary embodiment is a basic operation in which, by the rotation of the zoom ring, (1) the straight-proceeding barrel 122 is linearly extended, (2) the cam barrel 117 is rotationally extended, and (3) each lens unit other than the first lens unit is linearly extended.

Next, each lens unit will be described in detail. A first lens holding frame 101 is a holding frame that holds the first lens unit L1. The first lens holding frame 101 is fixed to the straight-proceeding barrel 122, which is linearly moved by a straight groove, a cam groove, and a cam follower, using a screw. Further, a first lens retainer ring 125 has a screw groove formed on the inner diameter portion thereof, and is screwed and fixed to a screw formed on the outer diameter portion of the straight-proceeding barrel 122. At this time, the first lens retainer ring 125 serves to fix the first lens unit L1.

Further, a filter frame 120 is fixed to the straight-proceeding barrel 122 by a screw, and a bayonet portion for attaching a hood is formed on the outer peripheral side and a screw is formed on the inner peripheral side, so that accessories such as a filter can be attached.

A second lens holding frame 102 is a holding frame that holds a second lens unit L2. The second lens holding frame 102 constitutes a part of a shake correction unit 108. The shake correction unit 108 holds the second lens holding frame 102 so as to be drivable in a direction orthogonal to the optical axis O (optical axis orthogonal direction), and performs shake correction by driving the second lens holding frame 102 by a shake correction drive unit including a magnet, a coil, and the like. The shake correction unit 108 is suspended and held on the guide barrel 116 by a cam follower (not shown).

A third lens holding frame 103 is a holding frame that holds a third lens unit L3. The third lens holding frame 103 is engaged with and held by three cam followers with respect to a rear unit base 126 (base member), and is advanced and retracted in the optical axis direction by a zoom operation by rear unit cam followers 123A, 123B, and 123C provided in the rear unit base 126. The third lens holding frame 103 holds an electromagnetic diaphragm unit 110 including a diaphragm driving portion and a diaphragm blade portion.

A fourth lens holding frame 104 as a first holding member is a holding frame that holds the fourth lens unit L4 as a first optical element that is a first floating unit. The movement of the fourth lens holding frame 104 in the optical axis direction is guided by a first guide unit 151. The fourth lens unit L4 (or the fourth lens holding frame 104) is advanced and retracted in the optical axis direction by the zooming operation of the rear unit base 126, and is further driven in the optical axis direction with respect to the rear unit base 126 by a first drive unit 161 which is a driving portion.

Here, a driving force transmission mechanism included in the first drive unit 161 includes a motor stator (not shown) and a motor movable element (not shown) which constitute a motor, and a motor driving transmission portion which is a part of the movable element. Further, the motor drive transmission portion includes a first rack 132 serving as a drive transmission member for transmitting the driving force of the motor to the fourth lens holding frame 104, and a first rack biasing spring 133 (first biasing member) for removing backlash between the first rack 132 and the motor drive transmission portion by biasing.

The fourth lens holding frame 104 is provided with a scale for position detection in the optical axis direction. Further, a corresponding optical sensor is provided on the rear unit base 126 via a flexible printed circuit board (FPC), and the scale and the optical sensor together constitute a first floating position detection unit.

A fifth lens holding frame 105 as a second holding member is a holding frame that holds the fifth lens unit L5 as a second optical element that is a second floating unit. The movement of the fifth lens holding frame 105 in the optical axis direction is guided by a second guide unit 152. The rear unit base 126 moves advanced and retracted in the optical axis direction by the zoom operation, and the fifth lens holding frame 105 is driven in the optical axis direction with respect to the rear unit base 126 by a second drive unit 162 which is a driving portion. The driving force transmission mechanism included in the second drive unit 162 has the same configuration as the driving force transmission mechanism included in the first drive unit 161 that drives the fourth lens unit L4.

A sixth lens holding frame 106 as a third holding member is a holding frame that holds the sixth lens unit L6 as a third optical element that is a focusing unit. The movement of the sixth lens holding frame 106 in the optical axis direction is guided by a third guide unit 153. The rear unit base 126 moves advanced and retracted in the optical axis direction by the zoom operation, and the sixth lens holding frame 106 is driven in the optical axis direction with respect to the rear unit base 126 by a third drive unit 163 which is a driving portion. The driving force transmission mechanism included in the third drive unit 163 has the same configuration as the driving force transmission mechanism included in the first drive unit 161 that drives the fourth lens unit L4. The fourth lens holding frame 104, the fifth lens holding frame 105, and the sixth lens holding frame 106, which move as described above, are hereinafter referred to as a moving unit.

A seventh lens holding frame 107 is a holding frame that holds the seventh lens unit L7. The seventh lens holding frame 107 is screwed and fixed to a seventh lens unit base 109, and is moved advanced and retracted in the optical axis direction by a zoom operation together with the seventh lens unit base 109 by three cam followers provided on the seventh lens unit base 109.

In present exemplary embodiment, when the fourth lens holding frame 104, the fifth lens holding frame 105, and the sixth lens holding frame 106 are driven, a motor using a piezoelectric element is used, and a motor movable element (not shown) can be driven in the optical axis direction with respect to a motor stator (not shown). However, for example, even in a mechanism in which a stepping motor is used, a movable element and a motor drive transmission portion are formed as a lead screw shaft, and the movable element and the motor drive transmission portion are connected to a rack, the same configuration can be realized. When the stepping motor is used, a detection system may be eliminated and the stepping motor may be controlled as an open drive.

In the present exemplary embodiment, the first to the third drive units 161 to 163 as the plurality of drive units are fixed to the rear unit base 126, but may be configured to be held movably in the optical axis direction with respect to the rear unit base 126. At least partial ranges of the first to the third drive units 161 to 163 may overlap each other in the optical axis direction. Further, the plurality of drive units may be constituted by two, or may be constituted by four or more.

The zoom operation barrel 118 is provided with a groove in which a movable element of a resistance type linear sensor 134 (potentiometer) serving as a zoom position detection unit (not illustrated) fixed to the guide barrel 116 is fitted. The output of the resistance type linear sensor 134 changes in accordance with the rotation amount of the zoom operation barrel 118, and zoom position information can be detected.

A focus operation barrel 114 is sandwiched between the front fixed barrel 115 and the rear-side fixed barrel 112 so as to be rotatable at a fixed position outside the front fixed barrel 115. Further, the rotation amount and direction of the focus operation barrel 114 are detected by a light detection element (not shown) provided in the front fixed barrel 115 and a scale (not shown) provided on the inner diameter portion of the focus operation barrel 114 and having light and dark portions.

A multi-purpose operation barrel 121 is sandwiched between the rear-side fixed barrel 112 and the exterior barrel 113 so as to be rotatable at a fixed position outside the rear-side fixed barrel 112. Similarly to the focus operation barrel 114, the rotation amount and direction of the multi-purpose operation barrel 121 are detected by a light detection element (not shown) provided in the rear-side fixed barrel 112 and a scale (not shown) provided on the inner diameter portion of the multi-purpose operation barrel 121 and having light and dark portions. The multi-purpose operation barrel 121 and the rear-side fixed barrel 112 are provided with a click mechanism including a click pin, a groove, and a spring for the purpose of giving a click feeling to a user, and a click position can also be detected by a light and dark pattern of black and white scales.

The control unit 119 is in charge of focus drive control and control of the entire interchangeable lens 100 such as the electromagnetic diaphragm unit 110 and the shake correction unit 108, and is screwed and fixed to the rear-side fixed barrel 112.

Figure 3:
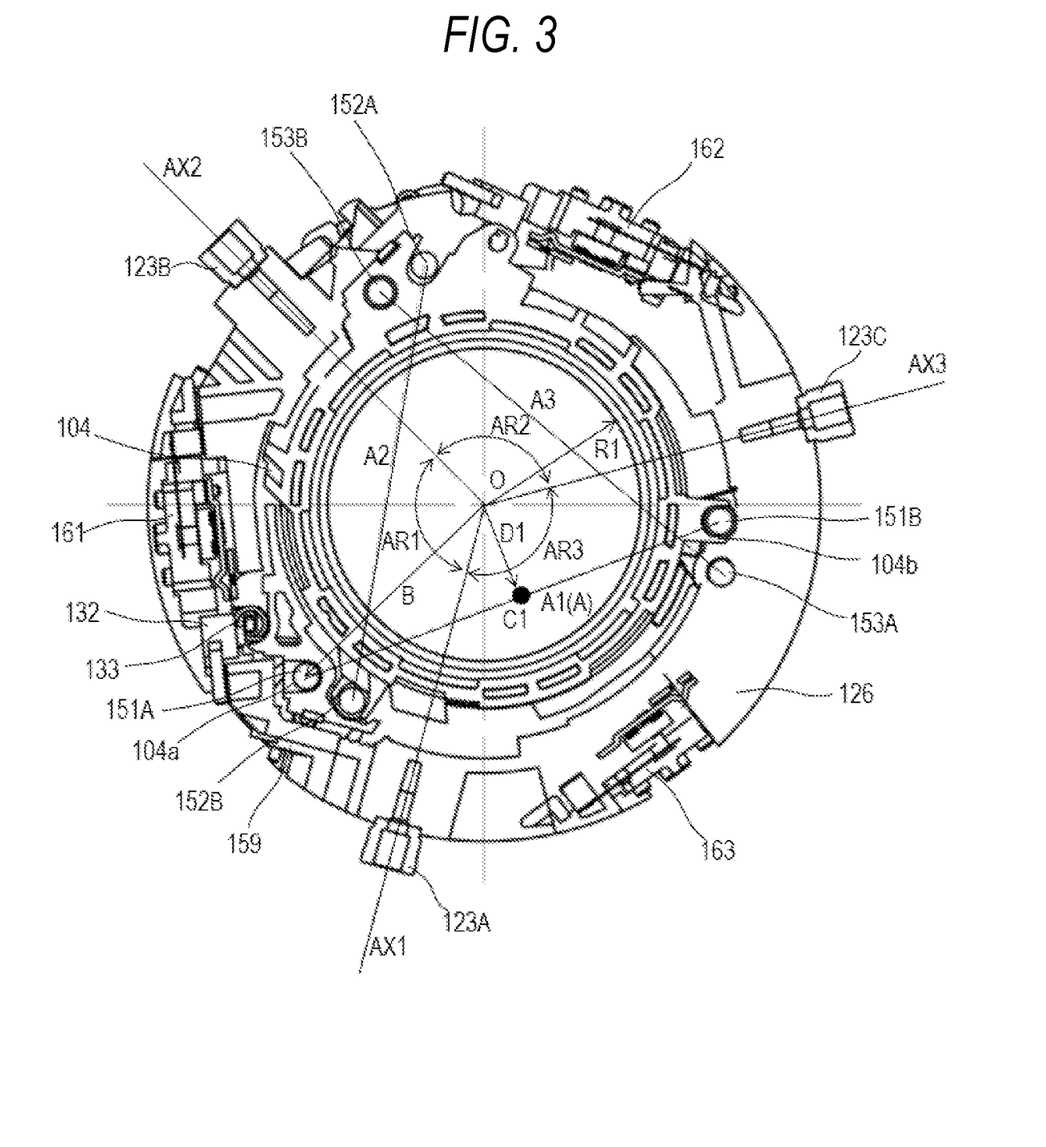
FIG. 3 is a cross-sectional view of a main part in the first embodiment.

Next, a configuration of a main part of the interchangeable lens 100 will be described with reference to FIGS. 2 and 3. FIG. 3 is a cross-sectional view of a main part in the first embodiment. The third lens unit L3 to the sixth lens unit L6 are held by the rear unit base 126 which is moved in the optical axis direction by the zooming operation. In FIG. 2, for the sake of simplicity, a fourth lens holding frame 104 to a sixth lens holding frame 106 corresponding to the fourth lens unit L4 to the sixth lens unit L6 are shown.

The first guide unit 151 is constituted by a pair of guide members (two guide bars) including a first main axis 151A (one member) and a first sub axis 151B (the other member). One end side of the first main axis 151A is held by the rear unit base 126, and the other end side is held by a first rear unit cover 127 fastened and fixed to the rear unit base 126. One end of the first sub axis 151B is held by the rear unit base 126, and the other end thereof is held by a third rear unit cover 129.

The first main axis 151A and the first sub axis 151B guide the movement of the fourth lens holding frame 104 in the optical axis direction, and a sleeve hole 104a of the fourth lens holding frame 104 engages with the first main axis 151A. In addition, the first rack 132 and the first rack biasing spring 133 are provided on the fourth lens holding frame 104, and the first rack biasing spring 133 generates a biasing force for rotating the first rack 132 which is rotatably provided.

The movable portion of the first drive unit 161 and the first rack 132 are engaged with each other at a position (not shown), and a rotational moment around the first main axis 151A is generated in the fourth lens holding frame 104 by the biasing force of the first rack biasing spring 133. In addition, the first rack biasing spring 133 biases the first sub axis 151B so that the first sub axis 151B comes into contact with a U-shaped groove 104b of the fourth lens holding frame 104, and the position of the fourth lens holding frame 104 with respect to the rear unit base 126 is determined by the biasing.

The position of the fourth lens holding frame 104 in the optical axis direction with respect to the rear unit base 126 is read by detecting a scale (not shown) fixed to the fourth lens holding frame 104 by a first position sensor 159 as a first detection unit fixed to the rear unit base 126.

The second guide unit 152 is constituted by a pair of guide members (two guide bars) including a second main axis 152A (one member) and a second sub axis 152B (the other member). One end side of the second main axis 152A is held by the rear unit base 126, and the other end side is held by a second rear unit cover 128 fastened and fixed to the rear unit base 126. One end side of the second sub axis 152B is held by the rear unit base 126, and the other end side is held by the first rear unit cover 127.

The second main axis 152A and the second sub axis 152B guide the movement of the fifth lens holding frame 105 in the optical axis direction, and a sleeve hole 105a of the fifth lens holding frame 105 engages with the second main axis 152A. In addition, a second rack and a second rack biasing spring (second biasing member), which are not illustrated, are provided on the fifth lens holding frame 105, and the second rack biasing spring generates a biasing force for rotating the second rack which is rotatably provided.

The movable portion of the second drive unit 162 and the second rack are engaged with each other at a position (not shown), and a rotational moment around the second main axis 152A is generated in the fifth lens holding frame 105 by the biasing force of the second rack biasing spring. In addition, the second rack biasing spring biases the second sub axis 152B so that the second sub axis 152B comes into contact with a U-shaped groove 105b of the fifth lens holding frame 105, and the position of the fifth lens holding frame 105 with respect to the rear unit base 126 is determined by this biasing.

The position of the fifth lens holding frame 105 in the optical axis direction with respect to the rear unit base 126 is read by detecting a scale (not shown) fixed to the fifth lens holding frame 105 by a second position sensor (not shown) as a second detection unit fixed to the rear unit base 126.

The third guide unit 153 is constituted by a pair of guide members (two guide bars) including a third main axis 153A (one member) and a third sub axis 153B (the other member). One end side of the third main axis 153A is held by the rear unit base 126, and the other end side is held by the third rear unit cover 129 fastened and fixed to the rear unit base 126. One end side of the third sub axis 153B is held by the rear unit base 126, and the other end side is held by the second rear unit cover 128.

The third main axis 153A and the third sub axis 153B guide the movement of the sixth lens holding frame 106 in the optical axis direction, and a sleeve hole 106a of the sixth lens holding frame 106 engages with the third main axis 153A. In addition, a third rack and a third rack biasing spring (third biasing member), which are not illustrated, are provided on the sixth lens holding frame 106, and the third rack biasing spring generates a biasing force for rotating the third rack which is rotatably provided.

The movable portion of the third drive unit 163 and the third rack are engaged with each other at a position (not shown), and a rotational moment around the third main axis 153A is generated in the sixth lens holding frame 106 by the biasing force of the third rack biasing spring. In addition, the third rack biasing spring biases the third sub axis 153B so that the third sub axis 153B comes into contact with a U-shaped groove 106b of the sixth lens holding frame 106, and the position of the sixth lens holding frame 106 with respect to the rear unit base 126 is determined by the biasing.

The position of the sixth lens holding frame 106 in the optical axis direction with respect to the rear unit base 126 is read by detecting a scale (not shown) fixed to the sixth lens holding frame 106 by a third position sensor (not shown) as a third detection unit fixed to the rear unit base 126.

In the rear unit base 126, rear unit cam followers 123A, 123B, and 123C for holding the rear unit base 126 on another member are provided at three positions in the circumferential direction around the optical axis O of the rear unit base 126. The rear unit base 126 is engaged with and held by the three rear unit cam followers 123A, 123B, and 123C with respect to the guide barrel 116 and the cam barrel 117.

In the present exemplary embodiment, it has been described that the fourth lens unit L4 is the first floating unit, the fifth lens unit L5 is the second floating unit, and the sixth lens unit L6 is the focusing unit, and these three lens units are driven at the time of focusing, but the present invention is not limited thereto. One may be a moving unit that moves during zooming, and the other may be a moving unit that moves during focusing. It is to be noted that the floating mechanism for moving the two movable units at the time of focus adjustment is used for correction of two variables of the focus position and the curvature of field, but the floating mechanism for moving the three movable units at the time of focus adjustment is used for correction of three variables of the focus position, the spherical aberration, and the curvature of field.

The arrangement of members constituting the main part of the present exemplary embodiment will be described in detail with reference to FIG. 3. A first axis AX1, a second axis AX2, and a third axis AX3 are axes that pass through the centers of the rear unit cam followers 123A, 123B, and 123C, respectively, with the optical axis O as the origin. Since the rear unit cam followers 123A, 123B, and 123C are disposed so as to be substantially equally divided into three, an angle formed by each of the first to third axis AX1 to AX3 is substantially 120 degrees.

In the present exemplary embodiment, the first axis AX1, the second axis AX2, and the third axis AX3 are axial lines passing through the rear unit cam followers 123A, 123B, and 123C, respectively, but the present invention is not limited thereto. For example, the rear unit cam followers 123A, 123B, and 123C may be cam followers that cause the rear unit base 126 to hold a fourth holding member that holds the fourth optical element. Further, a mounting portion such as a screw fastening portion may be used instead of the cam follower. Even in such a form, by disposing the drive unit and the guide member in different regions, the attachment portion can be secured in the vicinity of the boundary between the regions. Since it is not necessary to increase the size in order to secure the attachment portion, the size can be reduced.

When a region surrounded by the first axis AX1 and the second axis AX2 is referred to as a first region AR1, a region surrounded by the second axis AX2 and the third axis AX3 is referred to as a second region AR2, and a region surrounded by the third axis AX3 and the first axis AX1 is referred to as a third region AR3, each member is arranged as follows.

The first drive unit 161, the first rack 132, the first rack biasing spring 133, the first main axis 151A, and the second sub axis 152B are disposed in the first region AR1. The second drive unit 162, the second rack, the second rack biasing spring, the second main axis 152A, and the third sub axis 153B are disposed in the second region AR2. The third drive unit 163, the third rack, the third rack biasing spring, the third main axis 153A, and the first sub axis 151B are disposed in the third region AR3. The effect of this arrangement will be described below.

In the present exemplary embodiment, the plurality of lens units of the fourth lens unit L4 to the sixth lens unit L6 are driven using the first to the third drive units 161 to 163 which are electrically driven, and the lens units are configured to be close to each other. Further, in the present exemplary embodiment, by arranging the respective drive units and the respective guide members in the different regions, the mounting portions of the respective cam followers can be secured in the vicinities of the boundaries of the respective regions, so that the apparatus can be miniaturized. In addition, as a method of positioning each lens holding frame in a plane orthogonal to the optical axis O, as described above, each sleeve hole of each lens holding frame and each main axis are engaged with each other, and positioning of rotation around the axis of each sleeve hole is performed by each U groove of each lens holding frame and each sub axis. When a movement restricting end of each lens holding frame in the optical axis direction is considered, since the positioning portion in the optical axis orthogonal plane described above serves as the sliding portion, it is suitable to provide the movement restricting end in the vicinity of the sliding portion in terms of positional accuracy.

On the other hand, considering an inertial force due to the acceleration generated when an impact is applied to each lens holding frame, the mass of the optical system and the inertial force generated in each lens holding frame and other members act on the position of the center of gravity of these moving units. In general, since the mass of an optical system, that is, a lens is the largest, an inertial force is generated in the vicinity of the optical center.

Therefore, the best arrangement as the movement restricting end in the optical axis direction when the impact is applied is an arrangement in which each midpoint of a line segment connecting each main axis and each sub axis is located in the vicinity of the position of the center of gravity of each moving unit when viewed from the optical axis direction. This is because, as described above, when the impact is applied, by making the forces acting on the movement restricting end substantially the same, it is possible to minimize the influence of the reaction after acting on the restricting end.

From this point of view, it is also important that each line segment connecting each main axis and each sub axis is close to the position of the center of gravity. This is because, when the impact acts on each lens holding frame and the lens holding frame collides with the movement restricting end, by shortening the distance between each line segment connecting each main axis and each sub axis and the position of the center of gravity, the moment around the axis of each line segment connecting each main axis and each sub axis due to the generated reaction force is reduced.

In the present exemplary embodiment, a pair of the main axis and the sub axis corresponding to the same lens holding frame is arranged so as not to exist the same region, and is arranged so as to be positioned by the sub axis of the adjacent region in the clockwise direction in FIG. 3 with respect to the main axis. In this arrangement, a pair of the drive unit and the guide member are arranged at intervals of about 120 degrees and about 240 degrees around the optical axis O. As described above, since the rear unit cam followers 123A, 123B, and 123C are arranged to be substantially equally divided into three in the circumferential direction of the rear unit base 126, it is possible to realize miniaturization and improvement in impact resistance.

With this configuration, in all of the three moving units, the distance between the optical axis O and the line segment connecting the main axis and the sub axis can be shorter than the radius of the lens unit, or the midpoint of each line segment can be positioned within the effective diameter of each lens unit. FIG. 3 shows, as an example, that when a line segment connecting the first main axis 151A and the first sub axis 151B which are a pair of guide members is defined as a first line segment A1, a first length D1 (length) between the first line segment A1 and the optical axis O is shorter than a radius R4 of the fourth lens unit L4. Alternatively, it is shown that a first midpoint C1, which is the midpoint of the first line segment A1, is within the effective diameter of the fourth lens unit L4. Similarly, when a line segment connecting the second main axis 152A and the second sub axis 152B which are a pair of guide members is defined as a second line segment A2, a second length (not shown) between the second line segment A2 and the optical axis O is shorter than the radius (not shown) of the fifth lens unit L5. Alternatively, the midpoint (not shown) of the second line segment A2 is within the effective diameter of the fifth lens unit L5. Similarly, when a line segment connecting the third main axis 153A and the third sub axis 153B which are a pair of guide members is defined as a third line segment A3, a third length (not shown) between the third line segment A3 and the optical axis O is shorter than the radius (not shown) of the sixth lens unit L6. Alternatively, the midpoint (not shown) of the third line segment A3 is within the effective diameter of the sixth lens unit L6.

When the position of the center of gravity of the moving unit is considered, since the lens unit which is an optical system has the largest mass, each line segment can be brought close to the position of the center of gravity of each moving unit by the above-described arrangement, and thus it is possible to obtain a small size and high impact resistance.

In the present exemplary embodiment, the guide members are arranged such that the first to the third line segments A1 to A3 have intersections when viewed from the optical axis direction. With this configuration, each line segment connecting each main axis and each sub axis can be easily brought closer to the position of the center of gravity, and the impact resistance can be further improved.

Such an arrangement not only has high impact resistance, but also improves the holding accuracy of the lens holding frames because the sleeve holes and the U-shaped grooves can be arranged as far apart as possible. For example, among a length A (first line segment A1) between the first main axis 151A and the first sub axis 151B, a length B from the first main axis 151A to the optical axis O, and the positional errors of the first sub axis 151B and the U-shaped groove 104b, components orthogonal to a straight line connecting the first main axis 151A and the first sub axis 151B are δ. At this time, the holding accuracy of the optical system is represented by δ B/A, and it is understood that the holding accuracy of the fourth lens holding frame 104 is improved.

As described above, according to the first embodiment, it is possible to provide a compact optical apparatus having high impact resistance in an optical apparatus that performs focusing and zooming by moving three lens units using three electric drive units.

In the present exemplary embodiment, each main axis and each sub axis (paired with the main axis in the adjacent region) in each region are brought close to each other and can be held by the same rear unit cover, thereby realizing efficient arrangement, but the present invention is not limited thereto. For example, it is also possible to realize an efficient arrangement when viewed from the optical axis direction with each main axis and each sub axis in each region as the same component.

Further, in the present exemplary embodiment, it has been described that each lens holding frame driven by each drive unit is biased by each rack spring in a plane orthogonal to the optical axis O, but the present invention is not limited thereto. For example, another biasing means other than the rack spring may be used, or the biasing means may not be provided and the backlash between each main axis and each sleeve hole and between each sub axis and each U-groove may be suppressed. It is apparent that the above-described effect can be obtained even with such a configuration.

In the present exemplary embodiment, the drive unit is an ultrasonic motor, but is not limited thereto. For example, a stepping motor, a lead screw, a voice coil motor, or a combination thereof may be used. Further, the drive unit is not limited to an electrically driven unit, and may be, for example, a unit that obtains a driving force in the optical axis direction from the rotation of the cam barrel and drives the holding member in the optical axis direction.

Embodiment 2

Figure 4:
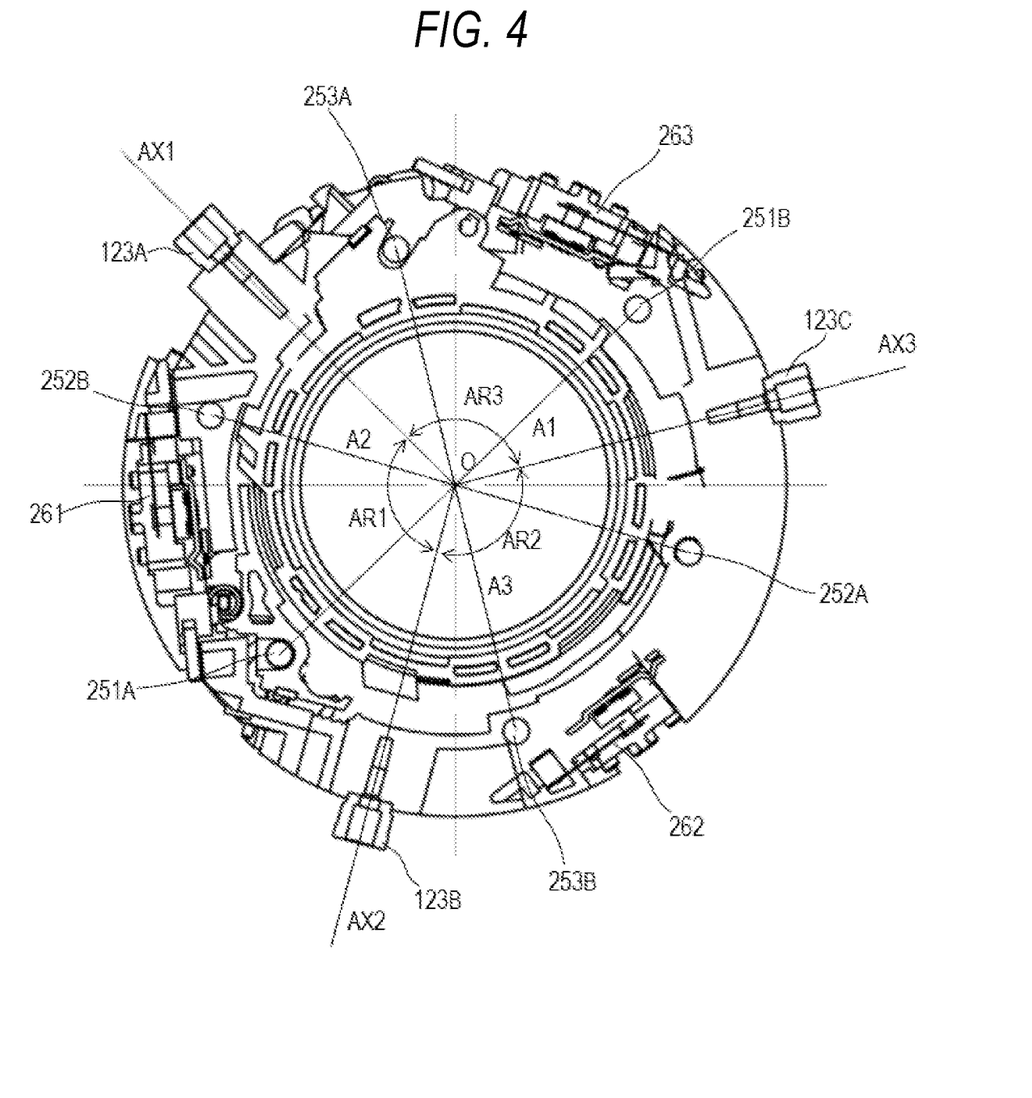
FIG. 4 is a cross-sectional view of a main part of the second embodiment.

In the first embodiment, each main axis and each sub axis (paired with the main axis in the adjacent region) in each region are arranged close to one boundary of the region, but in the second embodiment, the main axis is arranged close to one boundary of the region and the sub axis is arranged close to the other boundary of the region.

In addition, in first embodiment, the second optical element is the fifth lens unit L5, and the third optical element is the sixth lens unit L6, but in second embodiment, these are different. Specifically, the second optical element is the sixth lens unit L6, and the third optical element is the fifth lens unit L5. The configuration of each lens unit is the same as that in first embodiment.

FIG. 4 is a cross-sectional view of a main part of the second embodiment. The fourth lens unit L4 of the second embodiment is driven by a first drive unit 261, and is held by a first main axis 251A (one member) and a first sub axis 251B (the other member) which are a pair of guide members constituting a first guide unit 251. The sixth lens unit L6 is driven by a second drive unit 262, and is held by a second main axis 252A (one member) and a second sub axis 252B (the other member) which are a pair of guide members constituting a second guide unit 252. The fifth lens unit L5 is driven by a third drive unit 263, and is held by a third main axis 253A (one member) and a third sub axis 253B (the other member) which are a pair of guide members constituting a third guide unit 253. Further, in second embodiment, since the arrangement of the rear unit cam followers 123A and 123B is different from that of first embodiment, the arrangement of the first axis AX1 and the second axis AX2 is also different.

When a region surrounded by the first axis AX1 and the second axis AX2 is referred to as a first region AR1, a region surrounded by the second axis AX2 and the third axis AX3 is referred to as a second region AR2, and a region surrounded by the third axis AX3 and the first axis AX1 is referred to as a third region AR3, each member is arranged as follows.

The first drive unit 261, a first rack (not shown), a first rack biasing spring (not shown), the first main axis 251A, and the second sub axis 252B are disposed in the first region AR1. The second drive unit 262, a second rack (not shown), a second rack biasing spring (not shown), the second main axis 252A, and the third sub axis 253B are disposed in the second region AR2. The third drive unit 263, a third rack (not shown), a third rack biasing spring (not shown), the third main axis 253A, and the first sub axis 251B are disposed in the third region AR3.

With this configuration, it is possible to arrange each middle point of each line segment connecting each main axis and each sub axis, which are a pair of guide members, in the vicinity of the optical axis. The best arrangement as the movement restricting end in the optical axis direction when an impact is applied is an arrangement in which each middle point of each line segment connecting each main axis and each sub axis when viewed from the optical axis direction is located in the vicinity of the position of the center of gravity of the movable unit. However, since this is the case in the present exemplary embodiment, it is possible to further improve the impact resistance. Such an arrangement not only has high impact resistance, but also improves the holding accuracy of each lens holding frame because each sleeve hole and each U groove can be arranged as far apart as possible, as described in the first embodiment.

In FIG. 4, a line segment connecting the first main axis 251A and the first sub axis 251B which are a pair of guide members is shown as a first line segment A1, a line segment connecting the second main axis 252A and the second sub axis 252B which are a pair of guide member is shown as a second line segment A2, and a line segment connecting the third main axis 253A and the third sub axis 253B which are a pair of guide member is shown as a third line segment A3. When viewed from the optical axis direction, the first to the third line segments A1 to A3 substantially pass through the optical axis O, but the present invention is not limited thereto. It is apparent from the above description that when the barycenter of the respective moving units are different from each other, it is more preferable to arrange the respective middle points of the respective line segments in the vicinity thereof.

That is, when the barycenter of the fourth lens unit L4 driven by the first drive unit 261 is set as a first barycenter, the first line segment A1 substantially passes through the first barycenter, or the middle point (not shown) of the first line segment A1 and the first barycenter substantially coincide with each other. Similarly, when the barycenter of the sixth lens unit L6 driven by the second drive unit 262 is defined as a second barycenter, the second line segment A2 substantially passes through the second barycenter, or the middle point (not shown) of the second line segment A2 substantially coincides with the second barycenter. When the barycenter of the fifth lens unit L5 driven by the third drive unit 263 is defined as a third barycenter, the third line segment A3 substantially passes through the third barycenter, or the middle point (not shown) of the third line segment A3 substantially coincides with the third barycenter.

As described above, according to the second embodiment, it is possible to provide a compact optical apparatus having high impact resistance in an optical apparatus that performs focusing and zooming by moving three lens units using three electric drive units.

Embodiment 3

Figure 5:
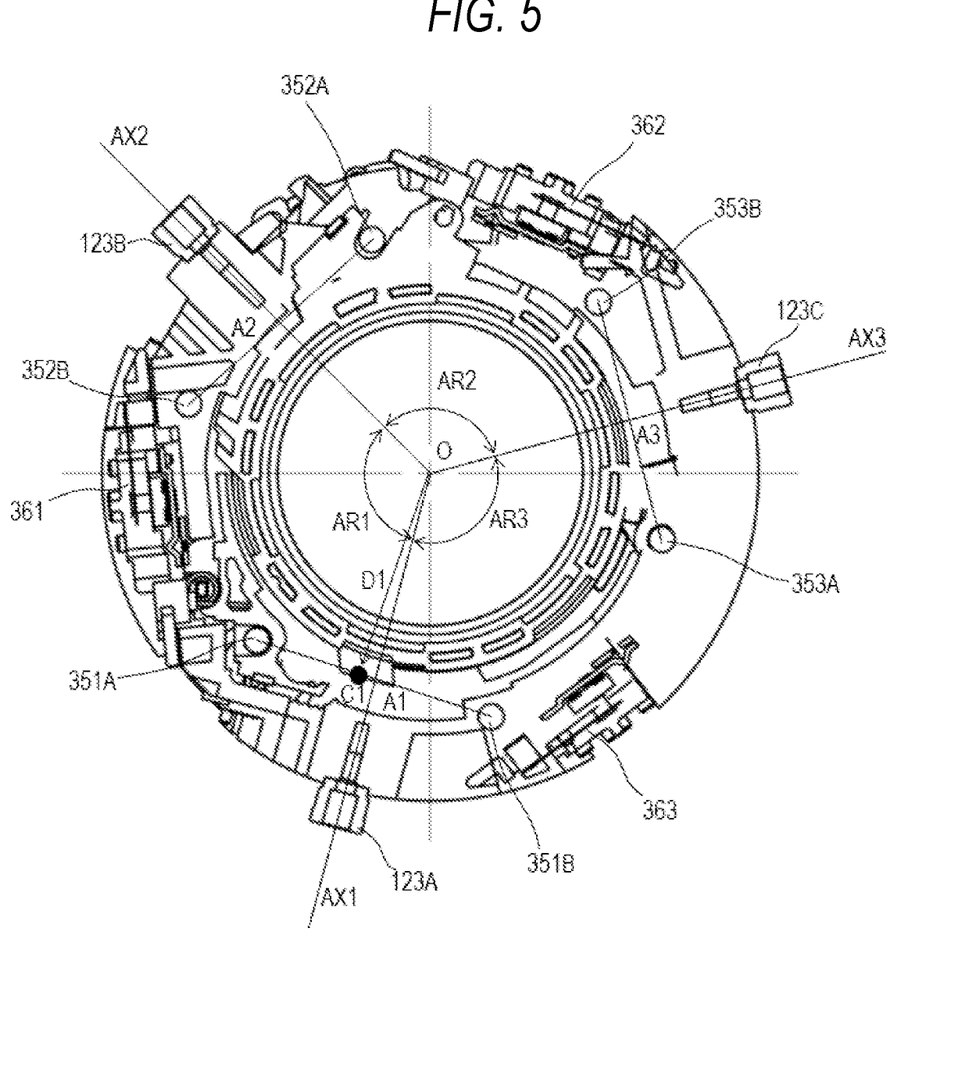
FIG. 5 is a cross-sectional view of a main part of the third embodiment.

In the first embodiment, the main axis and the sub axis are arranged close to one boundary of the area, but in the third embodiment, the main axis is arranged close to one boundary of the area, and the sub axis is arranged close to the other boundary of the area. Further, the members corresponding to the second and third aspects of the claims have the same correspondence in the third embodiment as in the first embodiment.

FIG. 5 is a cross-sectional view of a main part of the third embodiment. The fourth lens unit L4 of the third embodiment is driven by a first drive unit 361, and is held by a first main axis 351A (one member) and a first sub axis 351B (the other member) which are a pair of guide members constituting a first guide unit 351. The fifth lens unit L5 is driven by a second drive unit 362, and is held by a second main axis 352A (one member) and a second sub axis 352B (the other member) which are a pair of guide members constituting a second guiding unit 352. The sixth lens unit L6 is driven by a third drive unit 363, and is held by a third main axis 353A (one member) and a third sub axis 353B (the other member) which are a pair of guide members constituting a third guide unit 353.

The definitions of the first to third axis AX1 to AX3 and the first to third regions AR1 to AR3 are the same as those in the first embodiment. The first drive unit 361, a first rack (not shown), a first rack biasing spring (not shown), the first main axis 351A, and the second sub axis 352B are disposed in the first region AR1. The second drive unit 362, a second rack (not shown), a second rack biasing spring (not shown), the second main axis 352A (one member), and the third sub axis 353B are disposed in the second region AR2. The third drive unit 363, a third rack (not shown), a third rack biasing spring (not shown), the third main axis 353A, and the first sub axis 351B are disposed in the third region AR3.

In FIG. 5, a line segment connecting the first main axis 351A and the first sub axis 351B which are a pair of guide members is shown as a first line segment A1, a line segment connecting the second main axis 352A and the second sub axis 352B which are a pair of guide members is shown as a second line segment A2, and a line segment connecting the third main axis 353A and the third sub axis 353B which are a pair of guide members is shown as a third line segment A3. In the first and second embodiments, the arrangement is such that there is an intersection between the line segments, but in the third embodiment, the arrangement is such that there is no intersection.

As described above, according to the third embodiment, it is possible to provide a compact optical apparatus having high impact resistance in an optical apparatus that performs focusing and zooming by moving three lens units using three electric drive units.

In comparison with first or second embodiment, for example, it is clear from FIG. 5 that the first length D1 between the first midpoint C1 of the first line segment A1 connecting the first main axis 351A and the first sub axis 351B and the position of the center of gravity of the moving unit is long, but there are the following advantages. In third embodiment, since each sleeve hole and each U-groove formed in each lens holding frame can be arranged close to each other, it is possible to further miniaturize the interchangeable lens 100 while improving impact resistance.

Application Example

FIG. 6 is a schematic diagram illustrating a configuration example of the camera apparatus 1 (image pickup apparatus) using the interchangeable lens 100 (interchangeable lens for a single-lens reflex camera) to which the present disclosure is applied. The image pickup apparatus includes an interchangeable lens 100 and a camera apparatus 1 including a camera body 1a having an image sensor 1b that receives light from the interchangeable lens 100. The image pickup apparatus has a configuration in which the interchangeable lens 100 is detachably mounted from the camera body 1a of the camera apparatus 1, but the camera body 1a and the interchangeable lens 100 may be integrally configured.

Although preferred embodiments of the present disclosure have been described above, the present disclosure is not limited to these embodiments, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-116855, filed Jul. 22, 2022, which is hereby incorporated by reference herein in its entirety.

What is claimed is:

1. A lens apparatus comprising:
a first holding member that holds a first lens, a second holding member that holds a second lens, and a third holding member that holds a third lens;
a first guide unit configured to guide a movement of the first holding member, a second guide unit configured to guide a movement of the second holding member, and a third guide unit configured to guide a movement of the third holding member;
a plurality of drive units; and
a base member configured to hold the plurality of drive units;
wherein each of the first guide unit, the second guide unit, and the third guide unit includes a pair of guide members including one member and the other member;
when the base member is viewed along an optical axis of the lens apparatus, there are three regions divided in a circumferential direction around the optical axis, a region in which one member of the first guide unit is disposed is defined as a first region, a region in which one member of the second guide unit is disposed is defined as a second region, and a region in which one member of the third guide unit is disposed is defined as a third region;
the other member of the second guide unit is disposed in the first region;
the other member of the third guide unit is disposed in the second region; and
the other member of the first guide unit is disposed in the third region.

2. The lens apparatus according to claim 1, wherein when the base member is viewed along the optical axis, the base member is provided with engagement portions that engage with other members at three positions in a circumferential direction around the optical axis;
wherein when axes passing through the optical axis and the respective engaging portions are defined as a first axis, a second axis, and a third axis; and
wherein when the base member is viewed along the optical axis, the first region is between the first axis and the second axis, the second region is between the second axis and the third axis, and the third region is between the first axis and the third axis.

3. The lens apparatus according to claim 1, wherein, when the base member is viewed along the optical axis, three line segments connecting the respective pairs of guide members have respective intersections.

4. The lens apparatus according to claim 1, wherein when the base member is viewed along the optical axis, three line segments connecting the respective pairs of guide members pass through the optical axes of the first lens, the second lens, and the third lens.

5. The lens apparatus according to claim 1, wherein
when line segments connecting the pair of guide members are a first line segment, a second line segment, and a third line segment, respectively, when the base member is viewed along the optical axis;
a first distance between the first line segment and the optical axis is shorter than a radius of the first lens, or a middle point of the first line segment is within an effective diameter of the first lens;
a second distance between the second line segment and the optical axis is shorter than a radius of the second lens, or a middle point of the second line segment is within an effective diameter of the second lens; and
a third distance between the third line segment and the optical axis is shorter than a radius of the third lens, or a midpoint of the third line segment is within an effective diameter of the third lens.

6. The lens apparatus according to claim 5, wherein
the plurality of drive units includes a first, second and a third drive unit that drive the first, second and the third holding member, respectively, in an optical axis direction;
when a barycenter of a moving unit driven by the first drive unit is a first barycenter, a barycenter of a moving unit driven by the second drive unit is a second barycenter, and a barycenter of a moving unit driven by the third drive unit is a third barycenter;

wherein when the base member is viewed along the optical axis;

wherein the first line segment passes through the first barycenter, or a midpoint of the first line segment and the first barycenter coincide with each other;

wherein the second line segment passes through the second barycenter, or a midpoint of the second line segment and the second barycenter coincide with each other;

wherein the third line segment passes through the third barycenter, or a middle point of the third line segment and the third barycenter coincide with each other.

7. The lens apparatus according to claim 6, wherein at least partial ranges of the first, second and the third drive unit overlap each other in the optical axis direction.

8. The lens apparatus according to claim 1, further comprising a first, second and a third biasing member configured to generate a biasing force such that the first, second and the third holding member are brought into contact with the first, second and the other member of the third guide unit, respectively;

wherein the first, second and the third biasing member are disposed in the first, second and the third region, respectively.

9. The lens apparatus according to claim 1, wherein any one of the first lens, the second lens, and the third lens moves in an optical axis direction for zooming or focusing.

10. The lens apparatus according to claim 2, wherein the engaging portion causes the base member to hold a fourth holding member that holds a fourth lens.

11. An image pick up apparatus comprising:
a lens apparatus; and
an image pickup element configured to receive light from the lens apparatus, the lens apparatus comprising:

a first holding member that holds a lens, a second holding member that holds a second lens, a third holding member that holds a third lens;

a first guide unit configured to guide a movement of the first holding member, a second guide unit configured to guide a movement of the second holding member, and a third guide unit configured to guide a movement of the third holding member;

a plurality of drive units; and a base member configured to hold the plurality of drive units, wherein each of the first guide unit, the second guide unit, and the third guide unit includes a pair of guide members include one member and the other member;

when the base member is viewed along an optical axis of the lens apparatus, there are three regions divided in a circumferential direction around the optical axis, a region in which one member of the first guide unit is disposed is defined as a first region, a region in which one member of the second guide unit is disposed is defined as a second region, and a region in which one member of the third guide unit is disposed is defined as a third region;

the other member of the second guide unit is disposed in the first region;

the other member of the third guide unit is disposed in the second region;

wherein the other member of the first guide unit is arranged in the third region.

12. The lens apparatus according to claim 11, wherein the lens apparatus is detachably attached to the image pickup apparatus.

* * * * *